US007565760B2

(12) United States Patent
Maier-Hunke

(10) Patent No.: US 7,565,760 B2
(45) Date of Patent: Jul. 28, 2009

(54) BOARD, ESPECIALLY AN INFORMATION BOARD

(75) Inventor: Horst-Werner Maier-Hunke, Iserlohn (DE)

(73) Assignee: "Durable" Hunke & Jochheim GmbH & Co. KG, Iserlohn (DE)

(*) Notice: Subject to any disclaimer, the term of this patent is extended or adjusted under 35 U.S.C. 154(b) by 87 days.

(21) Appl. No.: 10/586,592

(22) PCT Filed: Feb. 1, 2005

(86) PCT No.: PCT/EP2005/001101

§ 371 (c)(1),
(2), (4) Date: Jul. 19, 2006

(87) PCT Pub. No.: WO2005/073942

PCT Pub. Date: Nov. 8, 2005

(65) Prior Publication Data

US 2007/0283605 A1 Dec. 13, 2007

(30) Foreign Application Priority Data

Feb. 2, 2004 (DE) .................. 20 2004 001 827 U
Jan. 26, 2005 (DE) .................. 20 2005 001 313 U

(51) Int. Cl.

| | |
|---|---|
| ***G09F 7/00*** | (2006.01) |
| ***G09F 23/10*** | (2006.01) |
| ***G09F 3/18*** | (2006.01) |
| ***G09F 3/20*** | (2006.01) |
| ***G09F 13/04*** | (2006.01) |
| ***A47B 96/00*** | (2006.01) |
| ***F16B 45/00*** | (2006.01) |
| ***A47G 1/10*** | (2006.01) |
| ***B42F 13/00*** | (2006.01) |
| ***A47F 5/08*** | (2006.01) |
| ***A47F 7/00*** | (2006.01) |
| ***A41F 1/00*** | (2006.01) |

(52) U.S. Cl. ............................ 40/611; 40/641; 40/658; 40/649; 40/568; 40/575; 248/225.11; 248/225.21; 248/307; 248/316.7; 248/340; 211/94.01; 211/70.6; 24/457; 24/458

(58) Field of Classification Search .................. 40/658, 40/659, 641, 518, 568, 575, 611.08, 611.1, 40/642, 642.02, 605, 611.06, 606.09; 248/551, 248/225.11, 225.21, 307, 316.7, 640, 200.1; 24/457, 458; 211/94.01, 70.6
See application file for complete search history.

(56) References Cited

U.S. PATENT DOCUMENTS 5,189,822 A * 3/1993 Schmanski et al. ....... 40/611.05

(Continued)

FOREIGN PATENT DOCUMENTS

DE 9104107 5/1991

(Continued)

*Primary Examiner*—Lesley D. Morris
*Assistant Examiner*—Syed A Islam
(74) *Attorney, Agent, or Firm*—Mark P. Stone

(57) ABSTRACT

The invention relates to a board that can be used especially as a board for a door in offices or administrative buildings. A base body (1) of said board comprises guiding grooves (2, 3) for an information carrier (4), on two opposing edges thereof, and a cover (5). Clamping slides (15) that can be introduced into a central groove (6) of the base body (1) are used to secure the position of the information carrier (4) and the cover (5), at least one of said slides being provided preferably with at least one display panel (23) that can be pivoted back and forth.

20 Claims, 4 Drawing Sheets

U.S. PATENT DOCUMENTS

2007/0101629 A1* 5/2007 Deniz .......................... 40/666

FOREIGN PATENT DOCUMENTS

| | | |
|---|---|---|
| EP | 0598196 | 5/1994 |
| FR | 2765021 | 12/1998 |
| GB | 2164916 | 4/1986 |

* cited by examiner

BOARD, ESPECIALLY AN INFORMATION BOARD

TECHNICAL FIELD

The invention relates to a sign, in particular an information sign, having a main body and a transparent covering panel, connected detachably with the main body, for a sheet-form information carrier suitable for accommodation between the main body and the covering panel, and having means for securely holding together the main body, the covering panel and the information carrier, the main body being provided at two mutually opposing edges with guide grooves for two likewise mutually opposing edges of the covering panel and of the information carrier.

PRIOR ART

Signs of the above type are known in the form of information signs in which the means for securely holding together the main body, the covering panel and the information carrier take the form of grub screws, which are guided in tapped holes in the rear wall of the main body and engage in recesses in the covering panel and the information carrier located in the area of the guide grooves.

The known signs are not fully satisfactory, insofar as both the cutting of the tapped holes for the grub screws in the rear wall of the main body and the need to use the grub screws are associated with undesirably high costs. Also disadvantageous is the fact that the covering panel and the information carrier have to be provided in the area of the grub screws with recesses precisely matching the position of the grub screws, in order to prevent incorrect positioning of the covering panel and the information carrier.

SUMMARY OF THE INVENTION

The object of the invention is so to develop a sign of the type in question that it can be produced cheaply without grub screws and tapped holes and without recesses in the covering panel and the information carrier associated with the grub screws. This object is achieved according to the invention in that the main body additionally comprises at least one undercut groove between its edges provided with guide grooves, said additional groove serving to accommodate at least one clamping slide, the end of which remote from the center of the groove forms a holder for one of the edges of the covering panel and of the information carrier not engaging in the guide grooves.

The signs according to the invention are particularly suitable for fixing on internal doors of administrative buildings. In practice, it is frequently the case that the occupant of a room does not want to be disturbed by visitors or wishes to indicate that he/she is not in his/her room at a given moment. In such cases it is conventional to use supplementary signs with inscriptions such as "Please do not disturb", "Out" or "On vacation", wherein the attachment of such supplementary signs regularly causes problems. In a particularly advantageous embodiment of the invention, the described shortcoming is remedied in that the clamping slide is provided in the area of its end forming the holder with a display panel which can be swiveled to and fro between two positions. The clamping slide or slides are thus not only used as holders, but also as carriers of additional information.

Further features and details of the invention will be revealed by the subordinate claims and the description given below of a particularly advantageous embodiment of the invention illustrated in the appended drawings.

WAYS OF IMPLEMENTING THE INVENTION

Figure 1:
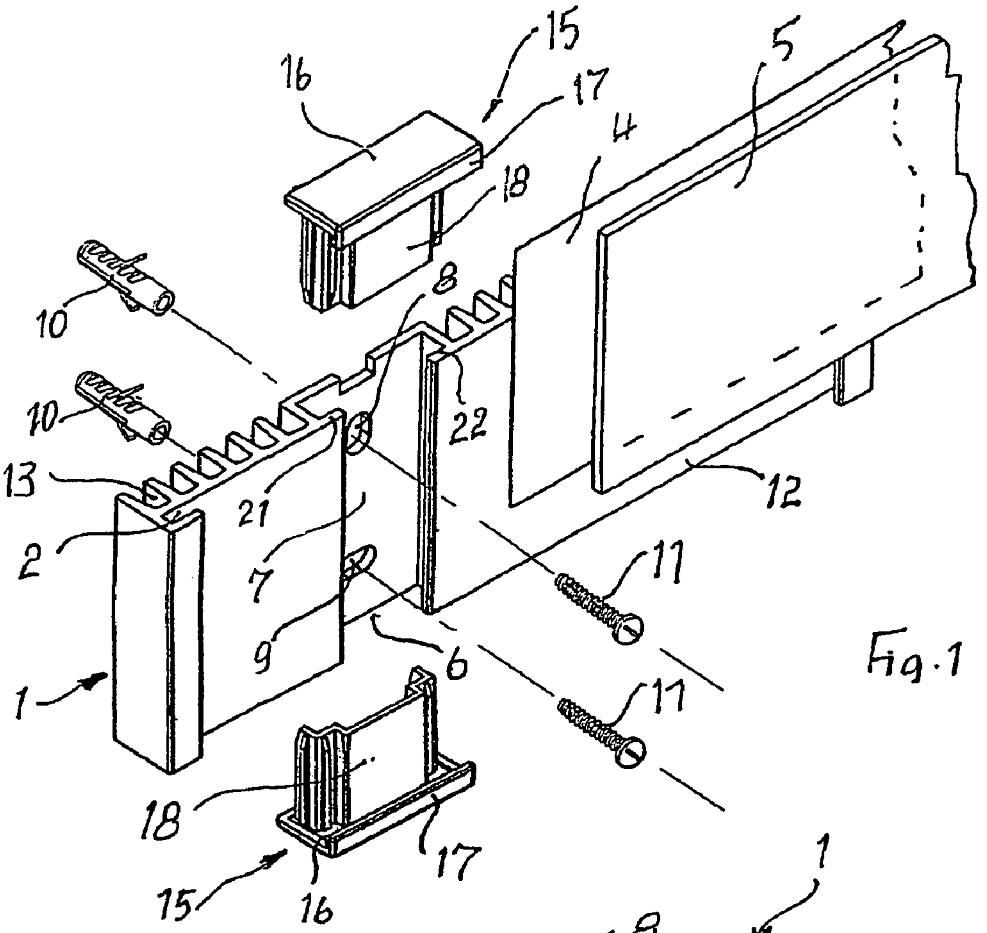
FIG. 1 shows a perspective exploded representation of a sign and the components serving to attach it.

In the figures, 1 is the main body of a sign formed by a portion of an extruded aluminum profile. This main body 1 comprises at two mutually opposing edges guide grooves 2 and 3 for accommodating two mutually opposing edges of an information carrier 4 and a transparent covering panel 5. Between the edges of the main body provided with the guide grooves 2, 3 there is located a further, undercut groove 6 of rectangular cross-section. The rear wall 7 of the groove 6 is provided with two slots 8 and 9, whose longitudinal axes are offset by 90° relative to one another to make it easier to fix the sign, e.g. to a wall, in the correct position. Wall mounting is achieved using wall plugs 10 and fastening screws 11.

Figure 2:
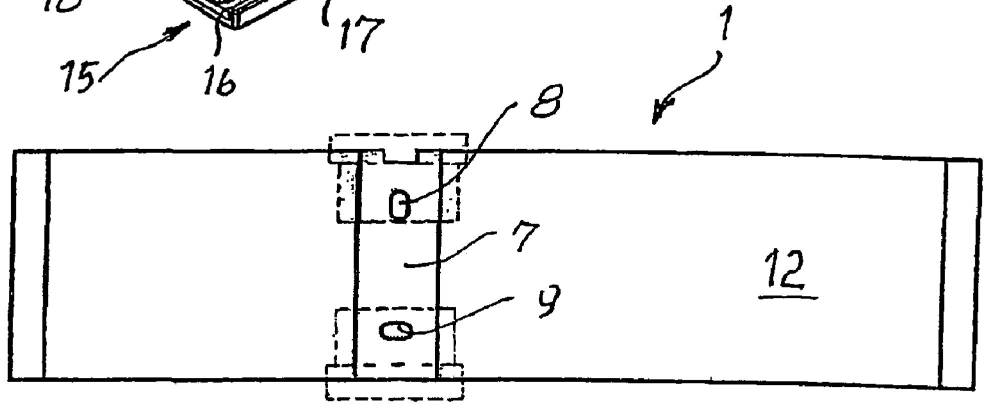
FIG. 2 shows the front view of the main body of the sign according to FIG. 1.
Figure 3:
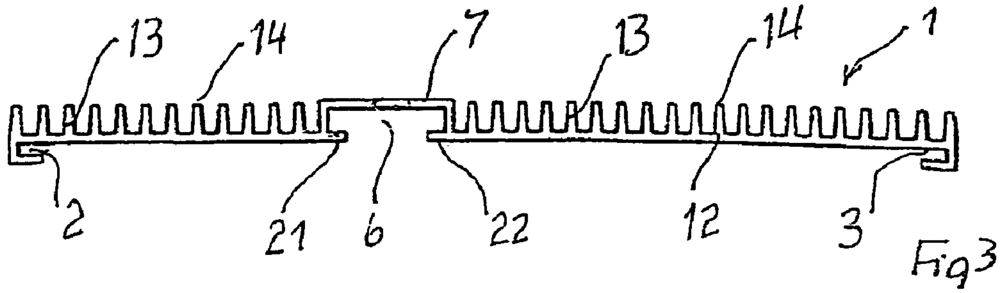
FIG. 3 shows the plan view of the top end of the main body according to FIG. 2.
Figure 4:
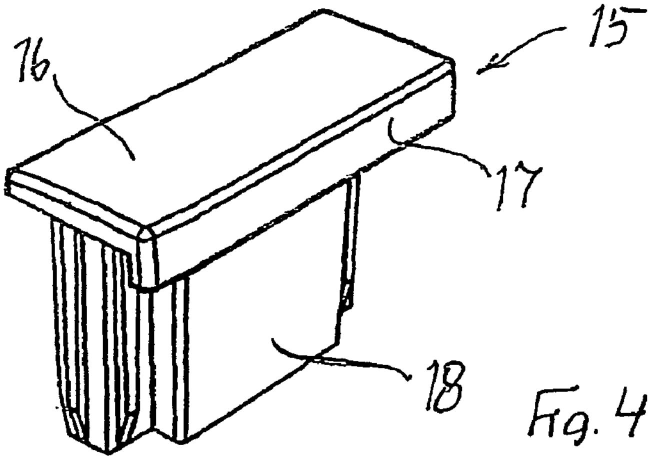
FIG. 4 shows a first enlarged perspective view of a clamping slide.
Figure 5:
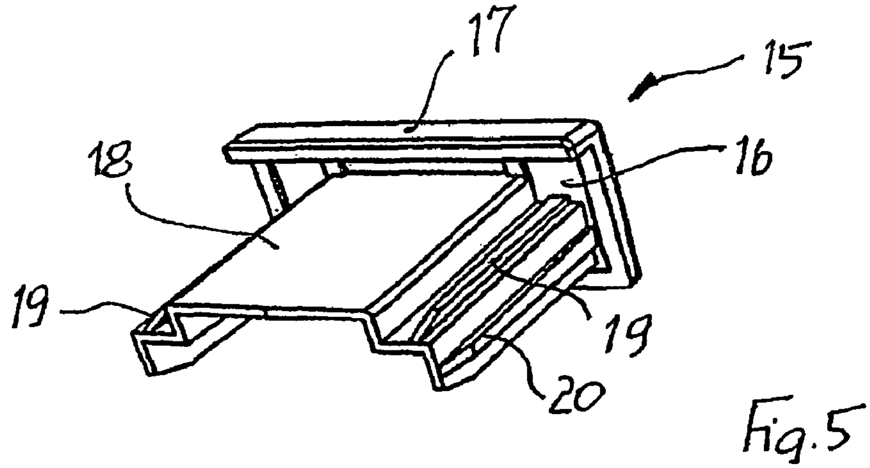
FIG. 5 shows a second enlarged perspective view of the clamping slide according to FIG. 4.
Figure 6:
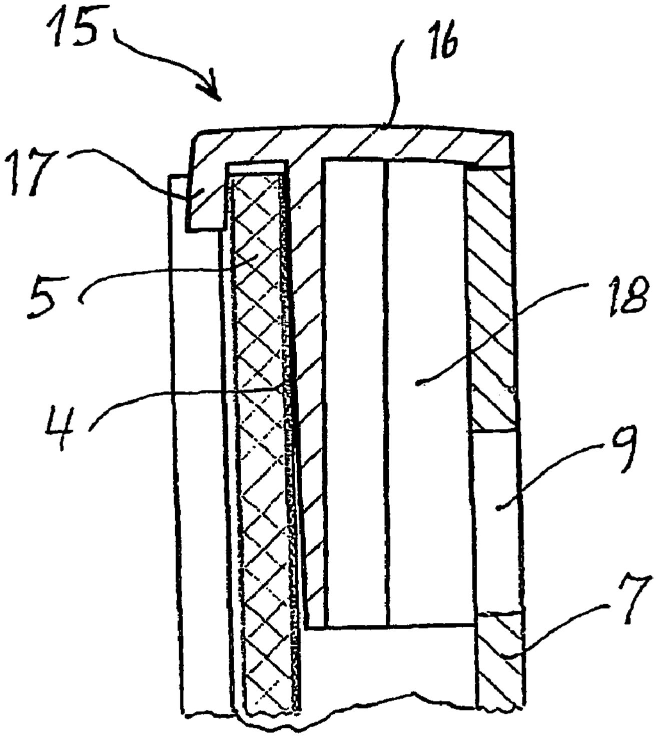
FIG. 6 shows an enlarged-scale view of the top clamping slide in the clamping position.
Figure 7:
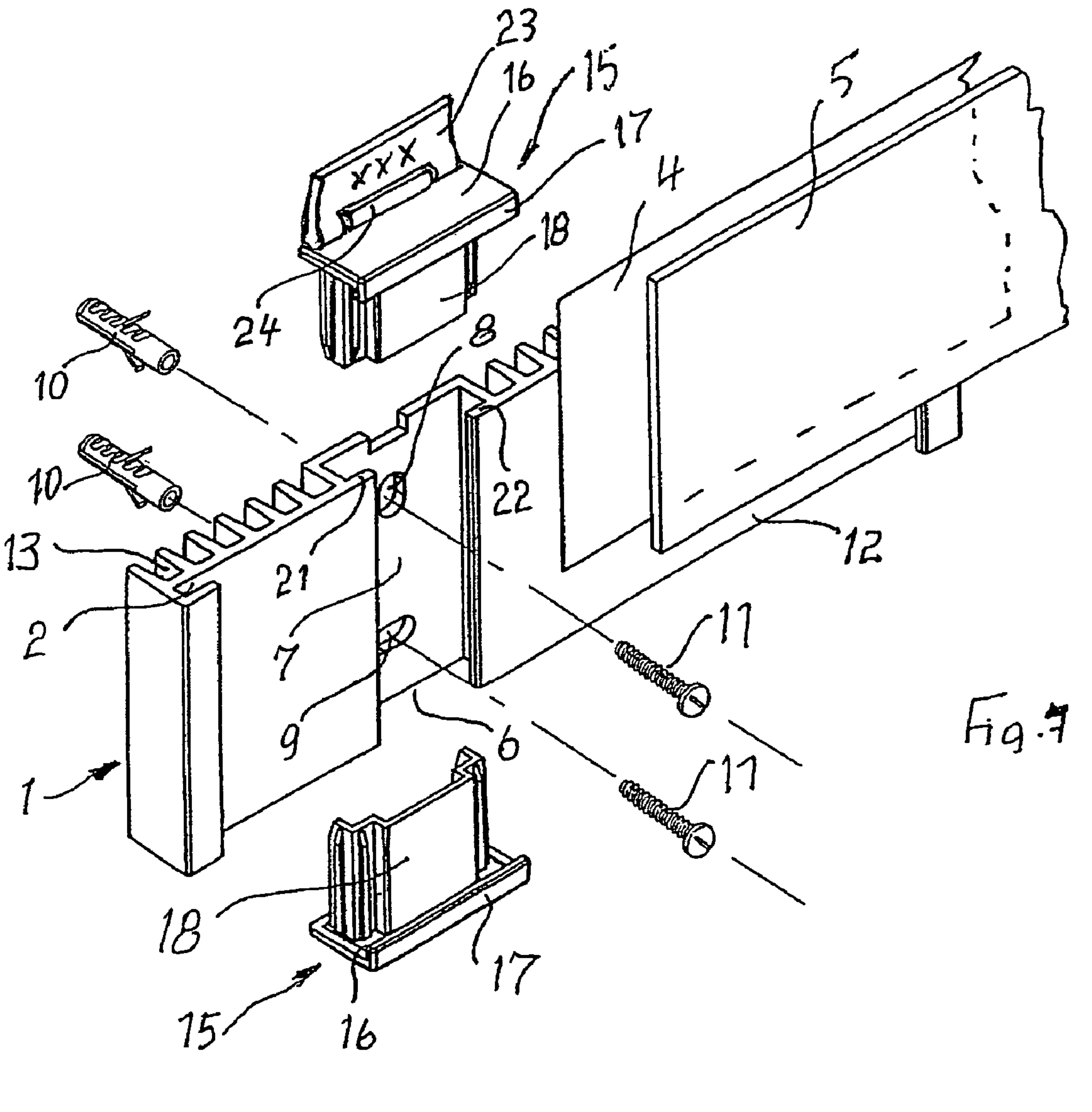
FIG. 7 shows a perspective exploded representation of a door sign with a top and a bottom clamping slide, in which one clamping slide is provided with a display panel.
Figure 8:
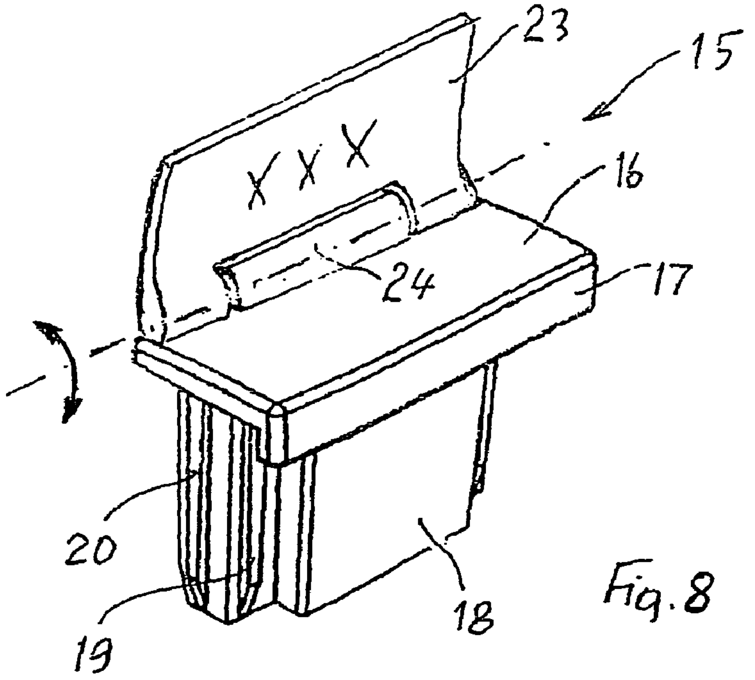
FIG. 8 shows an enlarged perspective view of the clamping slide provided with the display panel and FIG. 9 shows an enlarged-scale, sectional view of the clamping slide according to FIG. 8 in the clamping position.
Figure 9:
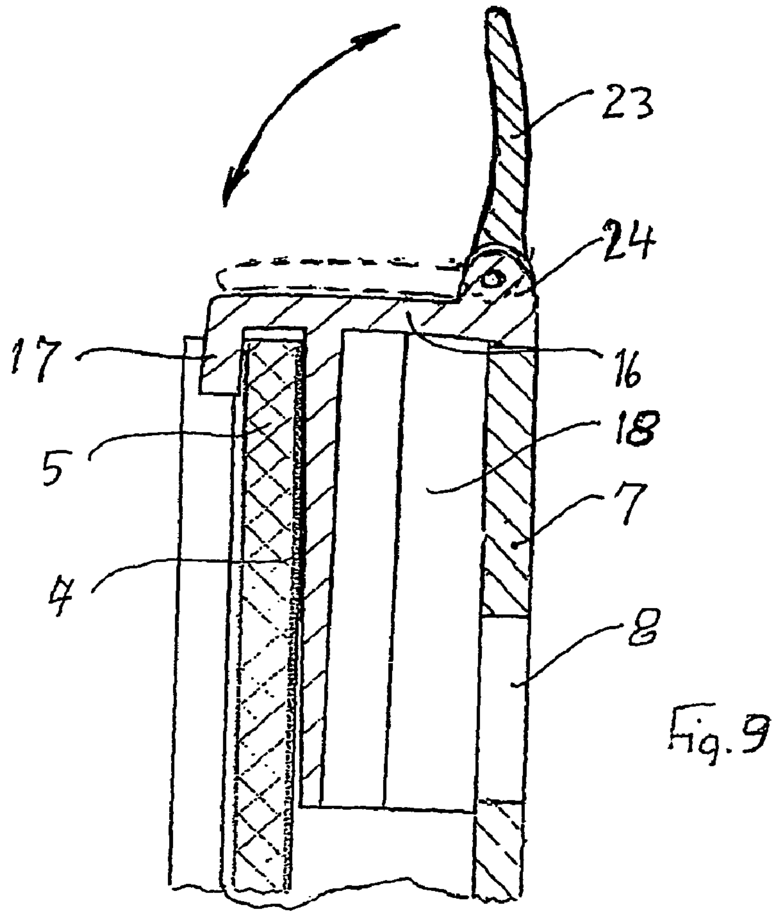

The wall 12 of the main body 1 comprises at its rear a plurality of ribs 13 extending parallel to the guide grooves 2 and 3, the smooth outer side of the planar rear wall 7 projecting slightly beyond the free ends 14 of said ribs so as to form a comparatively narrow defined contact face which, if need be, also makes it possible to attach the sign using "adhesive pads". To secure in position the covering panel 5 inserted into the guide grooves 2 and 3 and the information carrier 4 arranged behind said panel, there are provided two clamping slides 15, which take the form of injection molded parts of plastics material and can be introduced into the ends of the undercut groove 6 and are held frictionally in the groove 6 when inserted, wherein, when fitted, they cover the slots 8 and 9 and the heads of the screws 11, as indicated in FIG. 2. Details of the shape of the clamping slides 15 are revealed by FIGS. 4 to 6. The end of the clamping slides 15 coming to lie outside the groove 6 consists of a plate 16, one edge of which is bent and forms a narrow web 17, which engages over the front of the covering panel 5. The main part 18 of the clamping slide 15, which takes the form of a two-stepped, hollow base, extends perpendicularly to the plane of the plate. The upper step of the base corresponds in height to the thickness of the wall 12 and in width to the width of the opening left by the groove 6 in the main body 1. The lower steps of the base are provided, on their wall portions extending parallel to one another and perpendicularly to the web 17, with clamping webs 19 and 20, which, when the clamping slides 15 are fitted, rest against the inner faces of the branches 21, 22 of the groove 6 defining the opening left by the groove 6 and against the side walls of said groove, doing so with a contact pressure which ensures secure seating of the information carrier 4 and the covering panel 5 in the guide grooves 2 and 3 of the main body. In the preferred embodiment of the sign, a display panel 23 is arranged at the edge of the plate 16 of the top clamping slide 15 remote from the front of the sign, said display panel being mounted on a bearing block 24 so as to be swivelable to and fro between two positions. In the raised position shown in the figures, lettering affixed to the front of the display panel 23 indicates, for example, whether the room is occupied or its user would prefer not to be disturbed, which may also be expressed by making the front of the display panel 23 a suitable color, e.g. red. It goes without saying that the bottom clamping slide 15 may also be provided with a display panel 23 and furthermore that it is possible to position the clamping slide 15 at the side edges of a sign turned through 90°.

The invention claim is:

1. A sign, including an information sign, said sign having a main body (1) and a transparent cover (5), connected detachably with the main body (1), for a sheet-form information carrier (4) suitable for accommodation between the main body (1) and the cover (5); said sign having means for securely holding together the main body (1), the cover (5) and the information carrier (4), the main body (1) being provided with guide grooves (2, 3) for the cover (5), wherein the main body (1) additionally comprises, between side edges thereof in each case forming a guide groove (2, 3) for mutually opposing edges of the cover(5) and the information carrier (4), at least one undercut groove (6) extending parallel to and at a distance from the guide grooves (2, 3) of the main body (1), at least a portion of at least one clamping slide (15) being received within said undercut groove (6), an end of said at least one clamping slide (15) remote from the center of the undercut groove (6) forming a holder for one longitudinal edge of the cover (5) and of the information carrier (4) not engaging in the guide grooves (2, 3).

2. The sign as claimed in claim 1, wherein one said clamping slide (15) for the edges of the cover (5) and of the information carrier (4) not engaging in the guide grooves (2, 3) is associated with each of two ends of the undercut groove (6).

3. The sign as claimed in claim 1, wherein said main body (1) takes the form of a portion of an extruded profile.

4. The sign as claimed in claim 1, wherein the undercut groove (6) forms a rectangular channel open toward the front of the sign.

5. The sign as claimed in claim 1, wherein the main body (1) is provided at its rear with ribs (13) extending parallel to the guide grooves (2, 3).

6. The sign as claimed in claim 5, wherein a rear wall (7) of the undercut groove (6) projects slightly beyond free ends (14) of the ribs (13).

7. The sign as claimed in claim 1, wherein a rear wall (7) of the undercut groove (6) is provided with holes (8, 9) for fastening screws (11).

8. The sign as claimed in claim 7, wherein the holes (8, 9) take the form of slots offset relative to one another by 90°.

9. The sign as claimed in claim 7, wherein portions (18) of the clamping slides (15) introducible into the undercut groove (6) form covers for the holes (8, 9) and for heads of the fastening screws (11).

10. The sign as claimed in claim 1, wherein the clamping slides (15) comprise narrow webs (17) engaging over the edges of the cover(5).

11. The sign as claimed in claim 1, wherein the clamping slides (15) rest via clamping webs (19, 20) against inner walls of the undercut groove (6).

12. The sign as claimed in claim 1, wherein the clamping slides (15) take the form of injection molded parts of plastics material.

13. The sign as claimed in claim 1, wherein at least one said clamping slide (15) is provided, in the area of said end forming the holder, with a display panel (23) which can be swiveled to and fro between two positions.

14. The sign as claim 13, wherein the end of the clamping slide (15) forming the holder is constructed in the manner of a plate (16), said plate comprising at a rear edge thereof a bearing block (24) for the display panel (23).

15. The sign as claimed in claim 13, wherein only an end of the clamping slide (15) projecting beyond a top edge of the main body is provided with said display panel (23).

16. The sign as claimed in claim 13, wherein in one of its end positions, the display panel (23) covers an end of the clamping slide (15) projecting beyond the main body (1).

17. The sign as claimed in claim 2, wherein said main body (1) takes the form of a portion of an extruded profile.

18. The sign as claimed in claim 8, wherein portions (18) of the clamping slides (15) introducible into the undercut groove (6) form covers for the holes (8, 9) and for heads of the fastening screws (11).

19. The sign as claimed in claim 14, wherein only an end of the clamping slide (15) projecting beyond a top edge of the main body is provided with said display panel (23).

20. The sign as claimed in claim 14, wherein in one of its end positions, the display panel (23) covers an end of the clamping slide (15) projecting beyond the main body (1).

* * * * *